(12) United States Patent
Tsukamoto et al.

(10) Patent No.: US 11,173,965 B2
(45) Date of Patent: Nov. 16, 2021

(54) REAR VEHICLE-BODY STRUCTURE OF VEHICLE

(71) Applicant: MAZDA MOTOR CORPORATION, Hiroshima (JP)

(72) Inventors: Hideyuki Tsukamoto, Aki-gun (JP); Akiyoshi Masuda, Aki-gun (JP); Kouji Matsushita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 74 days.

(21) Appl. No.: 16/745,860

(22) Filed: Jan. 17, 2020

(65) Prior Publication Data
US 2020/0231221 A1   Jul. 23, 2020

(30) Foreign Application Priority Data

Jan. 23, 2019   (JP) .............................. JP2019-009036

(51) Int. Cl.
  *B62D 25/20*   (2006.01)
  *B62D 21/09*   (2006.01)
  *B60N 2/005*   (2006.01)

(52) U.S. Cl.
  CPC ............ *B62D 25/20* (2013.01); *B60N 2/005* (2013.01); *B62D 21/09* (2013.01)

(58) Field of Classification Search
  CPC ........ B62D 21/06; B62D 21/09; B62D 25/20; B60N 2/005; B60N 2/015
  See application file for complete search history.

(56) References Cited

U.S. PATENT DOCUMENTS

| | | | | |
|---|---|---|---|---|
| 2012/0306238 A1* | 12/2012 | Midoun | .................. | B60R 11/00 296/204 |
| 2014/0042791 A1* | 2/2014 | Gardner | .................... | B60N 2/68 297/452.14 |
| 2014/0265450 A1* | 9/2014 | Shafer | .................... | B62D 25/20 296/193.07 |
| 2016/0052467 A1* | 2/2016 | Dubois | .................. | B60K 13/04 296/193.07 |
| 2016/0090124 A1* | 3/2016 | Kaneko | .................. | B62D 21/11 296/203.04 |
| 2016/0207568 A1* | 7/2016 | Natsume | ................ | B62D 21/06 |
| 2016/0207572 A1* | 7/2016 | Natsume | ................ | B62D 25/20 |

(Continued)

FOREIGN PATENT DOCUMENTS

JP   2013-163470 A   8/2013

*Primary Examiner* — Gregory A Blankenship
(74) *Attorney, Agent, or Firm* — Studebaker & Brackett PC

(57) ABSTRACT

A rear vehicle-body structure comprises a rear-floor front part on which a rear seat is placed and which is inclined such that a front side thereof is located at a higher level than a rear side thereof, a right-and-left reinforcing extension having a rear end that is positioned on both sides, in a vehicle width direction, of the rear-floor front part. The right-and-left reinforcing extension extends forwardly and inwardly, in the vehicle width direction, from the rear end. The rear vehicle-body structure further includes a right-and-left second reinforcing extension provided on an outward side in the vehicle width direction of the right-and-left first reinforcing extension, and is configured to extend forwardly and outwardly in the vehicle width direction from a vicinity of the rear end of the right-and-left first reinforcing extension.

5 Claims, 6 Drawing Sheets

(56) References Cited

U.S. PATENT DOCUMENTS

| | | |
|---|---|---|
| 2016/0264177 A1* | 9/2016 | Kawaguchi ............ B62D 25/20 |
| 2017/0232877 A1* | 8/2017 | De Nichilo .............. B60N 2/70 |
| | | 297/452.18 |
| 2018/0029650 A1* | 2/2018 | Takahashi .............. B62D 43/10 |
| 2018/0037270 A1* | 2/2018 | Kawabe ................. B62D 25/08 |
| 2018/0126835 A1* | 5/2018 | Saeki ..................... B62D 21/02 |
| 2020/0223303 A1* | 7/2020 | Saeki ....................... B60K 1/04 |
| 2020/0231221 A1* | 7/2020 | Tsukamoto ........ B62D 25/2027 |
| 2021/0070375 A1* | 3/2021 | Ebisumoto ........... B62D 25/025 |
| 2021/0129910 A1* | 5/2021 | Aghssa ................. B60N 2/015 |

\* cited by examiner

REAR VEHICLE-BODY STRUCTURE OF VEHICLE

BACKGROUND

Technical Field

The present disclosure relates to a rear vehicle-body structure of a vehicle which comprises a floor on which a seat for the vehicle is placed, wherein the floor is inclined such that a front side thereof is located at a higher level than a rear side thereof.

Background Art

In a vehicle rear collision where some object collides with a vehicle, such as an automotive vehicle, from a rearward side of the vehicle, it is required that a rear-collision load applied from the rearward side is smoothly transmitted forwardly for its disperse and absorption. Accordingly, a rear vehicle-body structure of the vehicle is necessary to be configured such that a load path where the rear-collision load is transmitted forwardly from the rearward side of the vehicle can be as smooth as possible.

For example, Japanese Patent Laid-Open Publication No. 2013-163470 discloses a structure comprising a pair of right-and-left reinforcing frames which obliquely connect a pair of right-and-left suspension towers and a rear end portion of a center tunnel extending in a vehicle longitudinal direction at a central portion in a vehicle width direction.

Thereby, the structure disclosed in Japanese Patent Laid-Open Publication No. 2013-163470 transmits the rear-collision load inputted to a pair of right-and-left rear side frames to the center tunnel through the reinforcing frames, in addition to improving the vehicle-body rigidity against a load transmitted from a suspension, thereby achieving the dispersion of the rear-collision load (see paragraph [0045] and FIG. 10 of Japanese Patent Laid-Open Publication No. 2013-163470).

Meanwhile, a seat section of a rear seat as the vehicle seat, for example, is configured such that its front side is located at a higher level than its rear side for keeping an appropriate sitting position of a passenger. In order to provide such configuration of the seat section, there is a case where a rear floor on which the rear seat is placed is configured such that its front side is located at a higher level than its rear side as well.

In this case, it is necessary to improve the surface rigidity, in the vehicle longitudinal direction, of the rear floor against a force which acts on the rear seat so as to move the rear seat in the vehicle longitudinal direction when the vehicle is accelerated/decelerated (a so-called submarine phenomenon), for example.

The structure disclosed in Japanese Patent Laid-Open Publication No. 2013-163470, however, does not refer to any specific countermeasures for securing the surface rigidity of the rear floor, such as an appropriate arrangement of the reinforcing frames provided below the rear seat, and therefore there is still room for improvement.

SUMMARY

Accordingly, the present disclosure provides a rear vehicle-body structure of a vehicle which can improve the surface rigidity, in the vehicle longitudinal direction, of the rear floor against the force acting on the rear seat so as to move the rear seat in the vehicle longitudinal direction during vehicle traveling, achieving a smooth forward dispersion of the collision load in the vehicle rear collision.

The present disclosure is a rear vehicle-body structure of a vehicle, comprising a floor on which a seat for the vehicle is placed. The floor is inclined such that a front side thereof is located at a higher level than a rear side thereof. The rear vehicle-body structure also comprises a right-and-left first reinforcing extension. The right-and-left first reinforcing extension is configured such that a rear end thereof is positioned on both sides, in a vehicle width direction, of the floor and to extend forwardly and inwardly in the vehicle width direction from the rear end. The rear vehicle-body structure further comprises a right-and-left second reinforcing extension provided on an outward side in the vehicle width direction of the right-and-left first reinforcing extension. The right-and-left second reinforcing extension is configured to extend forwardly and outwardly in the vehicle width direction from a vicinity of the rear end of the right-and-left first reinforcing extension.

According to the present disclosure, since the rear-collision load can be smoothly transmitted to a forward side of the vehicle through the right-and-left first reinforcing extension in the vehicle rear collision and also a substantially-rectangular reinforcing structure can be formed by using the right-and-left first and second reinforcing extensions, the surface rigidity of the floor which is configured to be inclined such that its front side is located at the higher level than its rear side for keeping the appropriate sitting position of the passenger seated in the seat for the vehicle can be increased.

Additionally, the present disclosure can contribute to suppression of vibrations transmitted to the floor from a rear suspension and the like during the vehicle traveling because of increasing of the floor surface rigidity, and also since the rigidity of a whole part of a vehicle body including the floor is improved, the steering stability of the vehicle can be increased.

In an embodiment of the present disclosure, the right-and-left first reinforcing extension portions includes a right reinforcement and a left reinforcement. Each of the right reinforcement and the left reinforcement is joined to an upper surface of the floor so as to form a closed cross section therebetween which extends in an extension direction of the first reinforcing extension. The second reinforcing extension is a bead which is integrally formed with the floor According to this embodiment, since the right-and-left first reinforcing extension portion is configured to extend forwardly and inwardly in the vehicle width direction, at a position located on the inward side, in the vehicle width direction, of the bead, is made by the reinforcement, the rear-collision load can be efficiently transmitted forwardly from a vehicle-body rear part and also the surface rigidity, in the longitudinal direction, of the floor can be effectively increased. Meanwhile, since the right-and-left second reinforcing extension portion provided on the outward side, in the vehicle width direction, of the reinforcement is made by the bead, the weight reduction of the floor can be achieved.

In another embodiment of the present disclosure, a respective front end of each of the right reinforcement and the left reinforcement are connected to a central portion, in the vehicle width direction, of a front end portion of the floor.

According to this embodiment, the rear-collision load inputted to both sides of the vehicle-body rear part (rear side frames) can be smoothly transmitted from the above-described both sides to the center tunnel which extends forwardly from the central position, in the vehicle width direction, of the front end portion of the floor through the above-described right reinforcement and the left reinforcement in a plan view.

In another embodiment of the present disclosure, the rear vehicle-body structure of the vehicle further comprises a front-side cross member which is joined to a front end portion of the floor and extends in the vehicle width direction along the front end portion of the floor, and a respective front end of the right reinforcement and the left reinforcement are arranged proximate to the front-side cross member.

According to this embodiment, since a triangular reinforcing structure where the reinforcement, the bead, and the front-side cross member substantially enclose an inside area in the plan view can be provided at the both sides, in the vehicle width direction, of the floor, the surface rigidity of the floor can be further increased.

In another embodiment of the present disclosure, the rear vehicle-body structure of the vehicle further comprises a rear-side cross member which is joined to a rear end portion of the floor and extends in the vehicle width direction along the rear end portion of the floor, and respective rear end of each of the right reinforcement and the left reinforcement are arranged proximate to the rear-side cross member.

According to this embodiment, since a triangular reinforcing structure where the right reinforcement, the left reinforcement and the rear-side cross member substantially enclose an inside area in the plan view can be provided at a central side, in the vehicle width direction, of the floor, the surface rigidity of the floor can be further increased.

In another embodiment of the present disclosure, the floor is integrally formed by a low floor part which extends in a longitudinal direction, a slant part which extends obliquely forwardly-and-upwardly from a front end of the low floor part, and a high floor part which extends forwardly from an upper front end of the slant part. A seat section of the seat for the vehicle comprises a seat cushion part which forms a seat surface and a high-rigidity part which has a smaller mass per unit volume than the seat cushion part and has a high rigidity, the high-rigidity part being positioned at the slant part of the floor, and the right reinforcement, the left reinforcement and the bead are provided at least at the slant part of the floor.

According to this embodiment, since the seat section of the seat for the vehicle comprises the seat cushion part forming the seat surface, the cushion performance of the seat section can be properly secured. Additionally, since the seat section of the seat for the vehicle comprises the high-rigidity part, the weight reduction of the seat for the vehicle can be achieved.

Further, since the high-rigidity part is positioned at the slant part of the floor, it can be effectively suppressed that the seat section of the seat for the vehicle slides and moves, in the longitudinal direction, relative to the floor when the vehicle is accelerated/decelerated (especially in vehicle deceleration) (the so-called submarine phenomenon).

Moreover, since the right reinforcement, the left reinforcement and the bead are provided at least at the slant part of the floor, the surface rigidity of the slant part of the floor which is required to prevent the seat section of the seat for the vehicle from sliding and moving, in the longitudinal direction, relative to the floor can be effectively increased.

The present disclosure will become apparent from the following description which refers to the accompanying drawings.

DETAILED DESCRIPTION

Figure 1:
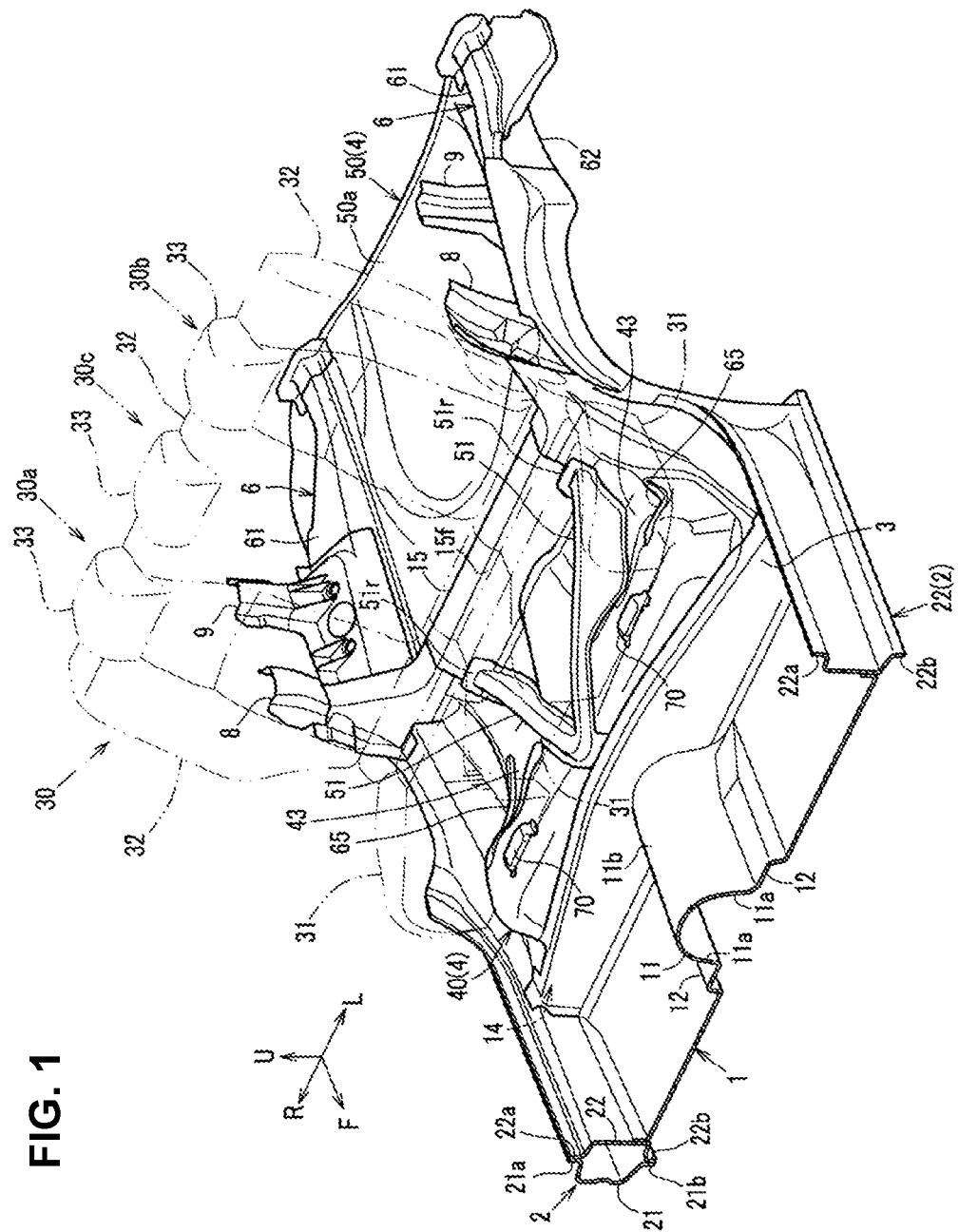
FIG. 1 is a perspective view of a major part of a rear vehicle-body structure of an automotive vehicle of the preset embodiment, when obliquely viewed from a forward-leftward-upward side.

Hereafter, an embodiment of the present disclosure will be described referring to the drawings. In figures, an arrow F shows a front (forward) side of an automotive vehicle, an arrow R shows a right (rightward) side of the automotive vehicle, an arrow L shows a left (leftward) side of the automotive vehicle, and an arrow U shows an upper (upward) side of the automotive vehicle.

Figure 2:
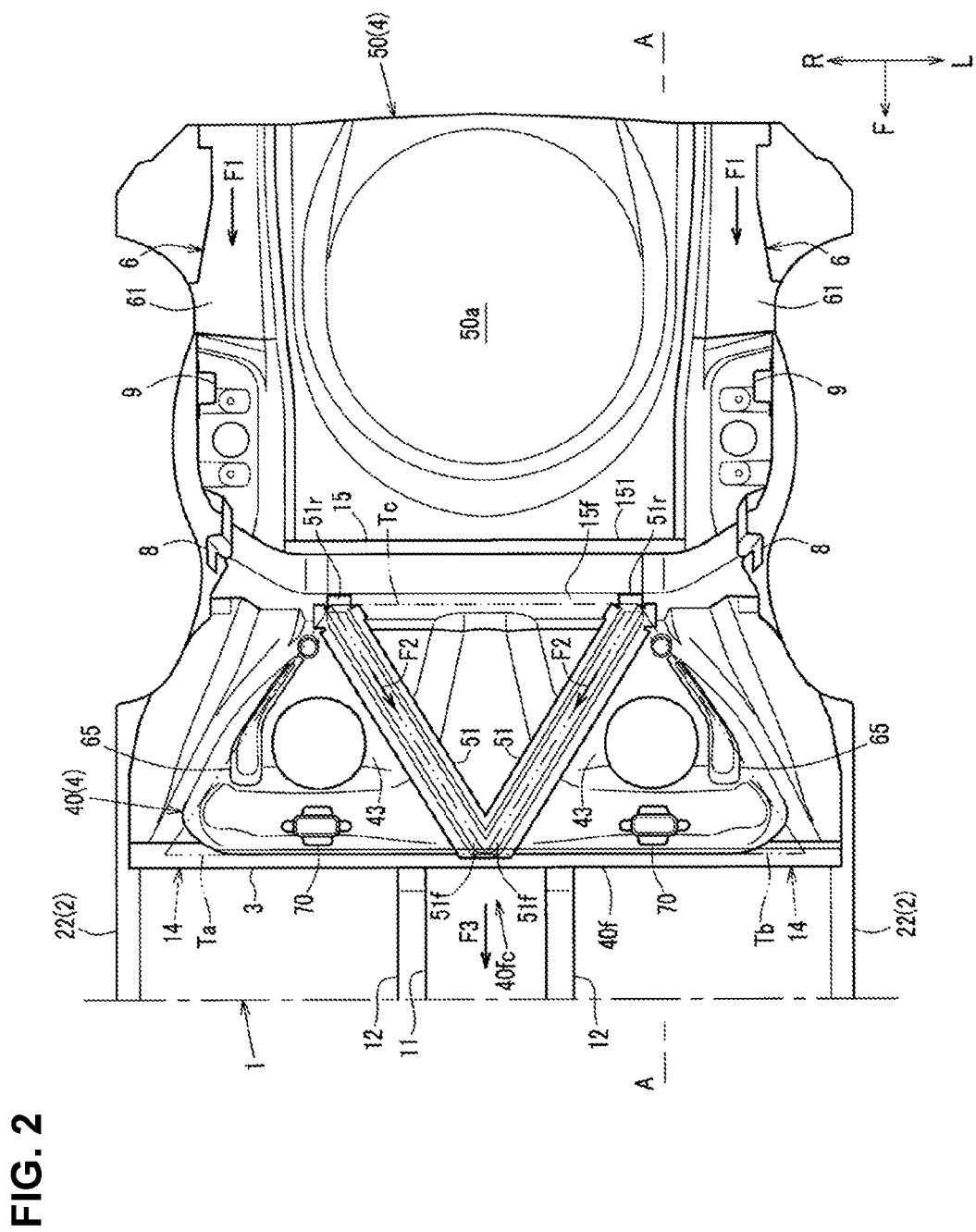
FIG. 2 is a plan view showing the major part of the rear vehicle-body structure of the automotive vehicle of the preset embodiment.

As shown in FIGS. 1 and 2, a vehicle body of an automotive vehicle (hereafter, referred to as a "vehicle") of the present embodiment comprises a floor panel 1 which forms a floor surface of a cabin and side sills 2 which are fixedly joined to both sides of the floor panel 1.

A center tunnel 11 as a tunnel portion which extends forwardly from a rear end of the floor panel 1 is provided at a central part, in a vehicle width direction, of the floor panel 1 (a front-side floor portion). As shown in FIG. 1, the center tunnel 11 is integrally formed by right-and-left side walls 11a and an upper-side top deck portion 11b in a semi-cylindrical shape. Further, a pair of right-and-left tunnel members 12 (tunnel side frames) which extend in a vehicle longitudinal direction and primarily provide vehicle-body rigidity are integrally formed at respective lower portions of the right-and-left side walls 11a of the center tunnel 11.

While the center panel 11 and the tunnel members 12 are integrally formed as a part of the floor panel 1 in the present embodiment, these members 11, 12 may be made separately and then joined together such that the tunnel members 12 are fixedly joined to the lower portions of the center tunnel 11.

Figure 6:
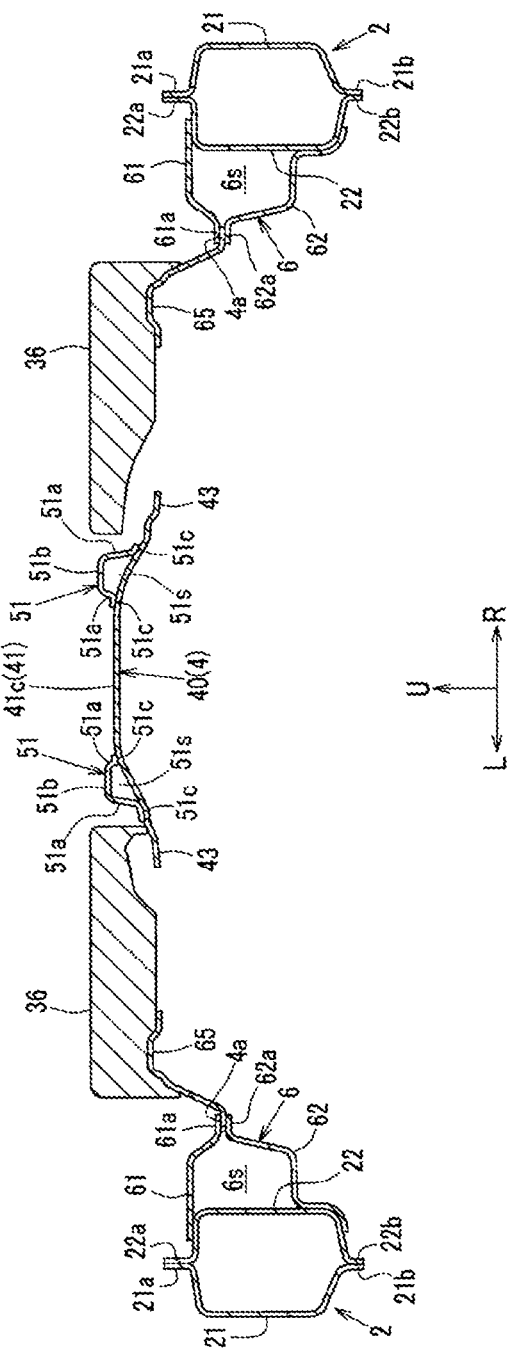
FIG. 6 is a sectional view taken along line B-B of FIG. 5.

As shown in FIGS. 1, 2 and 6, each of the side sills 2 provided at the both sides of the floor panel 1 is a vehicle-body high-rigidity member which is formed by joining respective upper-and-lower joint flanges 21a, 22a, 21b, 22b of a side sill outer 21 and a side sill inner 22 and has a closed cross section extending in the vehicle longitudinal direction. Herein, illustration of the side sill outer 21 of the left-side side sill 2 shown in FIG. 1 and illustration of the side sill outers 21 of the both-side side sills 2 shown in FIG. 2 are omitted.

Figure 3:
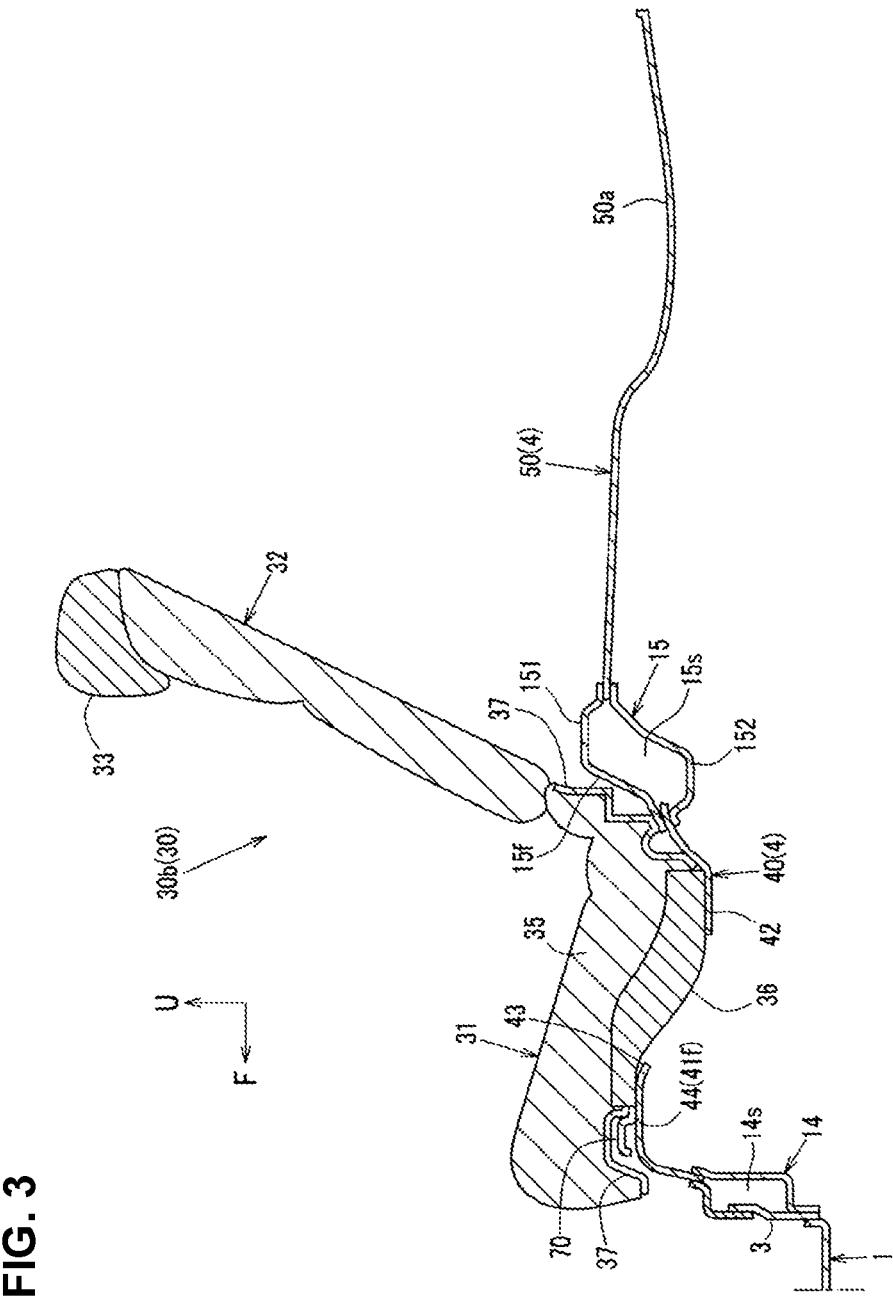
FIG. 3 is a sectional view taken along line A-A of FIG. 2.

As shown in FIGS. 1 through 3, a rear floor (rear floor panel) 4 which forms a vehicle-body rear floor is integrally provided at a rear part of the floor panel 1 via a kick-up portion 3 which rises upwardly.

Figure 5:
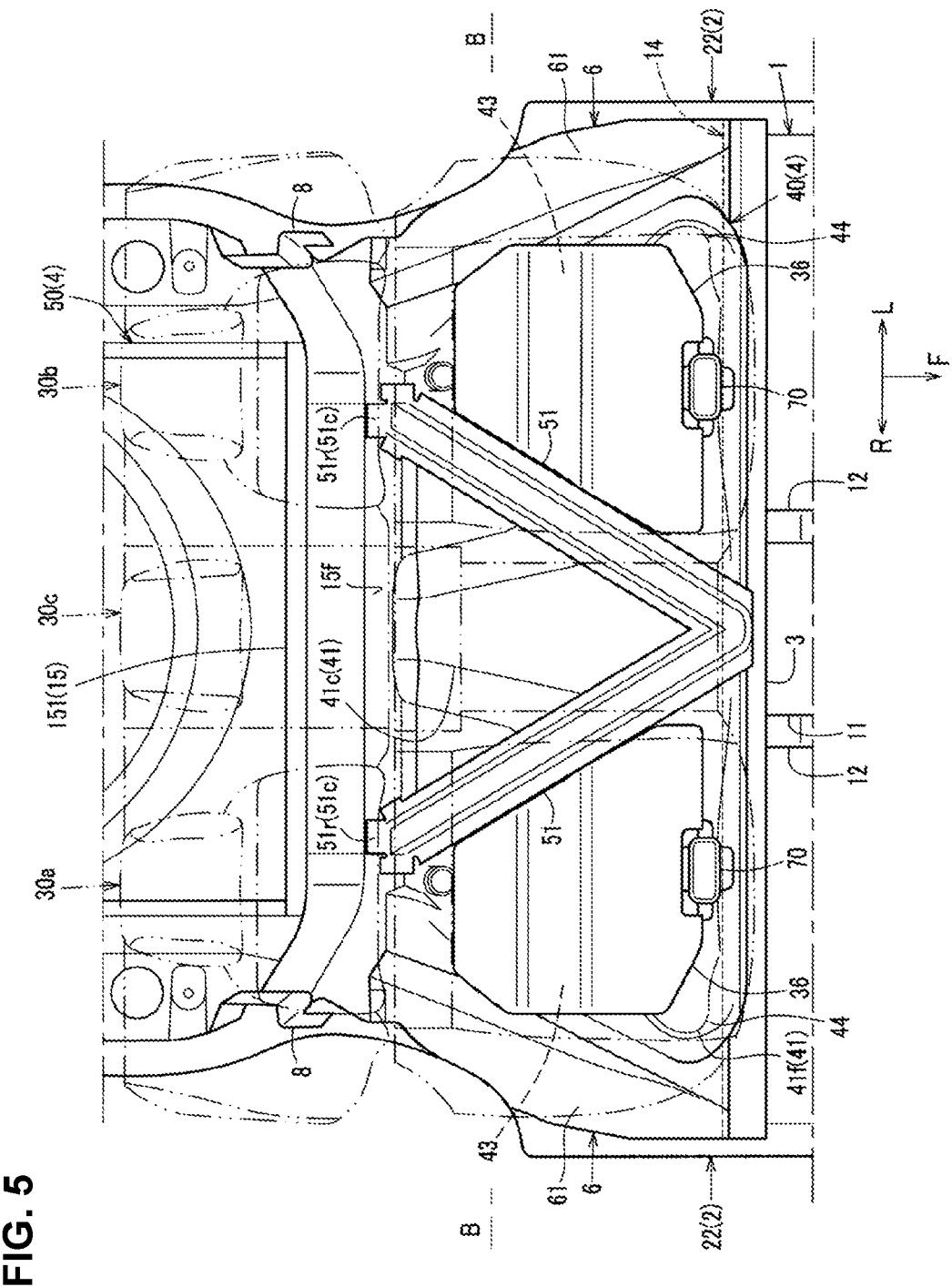
FIG. 5 is a major-part enlarged view showing an arrangement state of a cushion form portion which a rear seat comprises at the rear-floor front part, which corresponds to FIG. 2.

The rear floor 4 comprises a rear-floor front part 40 and a rear-floor rear part 50 which is positioned on a rearward side of and at a higher level than the rear-floor front part 40. The rear-floor front part 40 corresponds to a floor portion positioned behind the cabin, which is formed as a seat pan where a rear seat 30 is placed as shown in FIGS. 1 and 5.

A fuel tank, not illustrated, is disposed below the rear-floor front part 40. This fuel tank is protected with an insulator, not illustrated. As shown in FIGS. 1 through 3, a recess portion 50a is integrally formed at a central portion, in the vehicle width direction, of the rear-floor rear part 50. This recess portion 50a is configured to be concaved downwardly and serves as a storage for a spare tire or another parts.

As shown in FIGS. 1 and 2, rear side frames (hereafter, referred to as "frame members") 6 which extend in the vehicle longitudinal direction are provided at right-and-left both sides of the rear floor 4.

As shown in FIGS. 1 and 2, each of the frame members 6 is provided as a vehicle-body side rigidity member which has a closed cross section 6s (see FIG. 6) which extends in the vehicle longitudinal direction from the kick-up portion 3 up to a rear end of the rear floor 4. As shown in FIGS. 1, 2 and 6, a front end of this frame member 6 is connected to a rear portion of the side sill 2 from an inward side in the vehicle width direction.

As shown in the same figures, the frame member 6 comprises a frame-member upper portion 61 which has a hat-shaped cross section protruding upwardly, a frame-member lower portion 62 which has a hat-shaped cross section protruding downwardly over a whole range, in the vehicle longitudinal direction, of the frame member 6 (see FIG. 6), and others. These frame-member upper and lower portions 61, 62 have joint flange portions 61a, 62a at respective inward ends, in the vehicle width direction, thereof (see the same figures), and these joint flange portions 61a, 62a and an outward end portion 4a, in the vehicle width direction, of the rear floor 4 which is interposed between the joint flange portions 61a, 62a are joined together by welding in a three-layer joint state (see the same figures).

Herein, reference characters 8, 9 shown in FIGS. 1 and 2 denote side braces which extend in a vertical direction and reinforce a wheelhouse inner (not illustrated) which is positioned on the outward side, in the vehicle width direction, of the frame member 6 from the inward side in the vehicle width direction.

Further, as shown in FIGS. 1 through 3 and 5, a front-side rear cross member 14 (a so-called No. 3 cross member) which extends in the vehicle width direction is fixedly joined to a downward-and-rearward portion of an upper-side corner portion of the above-described kick-up portion 3, and a closed cross section 14s (see FIG. 3) which extends in the vehicle width direction is formed between the front-side rear cross member 14 and the kick-up portion 3, whereby the vehicle-body rigidity is improved. The front-side rear cross member 14 is made of a member having an L-shaped cross section and interconnects the right-and-left frame members 6 in the vehicle width direction.

Further, as shown in FIGS. 1 through 3 and 5, a rear-side rear cross member 15 is provided at a border between the rear-floor front part 40 and the rear-floor rear part 50. The rear-side rear cross member 15 comprises, as shown in FIG. 3, a rear-side rear cross member upper 151 and a rear-side rear cross member lower 152 which are respectively positioned on an upward side and on a downward side of the rear floor 4, and these members 151, 152 are fixedly joined together by spot welding in such a manner that a rear end portion of the rear-floor front part 40 and a front end portion of the rear-floor rear part 50 are interposed between these members 151, 152.

The rear-side rear cross member 15 is a rear cross member (a so-called No. 4 cross member) which extends in the vehicle width direction and interconnects the right-and-left frame members 6 in the vehicle width direction, and a closed cross section 15s which extends in the vehicle width direction is formed between the rear-side rear cross member upper 151 and the rear-side rear cross member lower 152 (see FIG. 3). Herein, a lower portion of the front-side side brace 8 extending in the vertical direction is connected to an outward portion, in the vehicle width direction of the rear-side rear cross member 15 (the rear-side rear cross member upper 151) (see FIG. 1).

As shown in FIGS. 1 and 5, the rear seat 30 is a laterally-long bench seat which comprises right-and-left seats 30a, 30b and a center seat 30c, and each of the seats 30a, 30b, 30c primarily comprises a seat section 31 which forms a seat surface for a passenger, a seatback section 32 which forms a backrest surface for the passenger and is provided with a headrest 33, and others as shown in FIG. 3.

Since at least each seat section 31 of the above-described seats 30a, 30b, 30c of the rear seat 30 has a substantially-same internal structure, a major part of the internal structure of the seat section 31 will be described based on a structure of the left-side seat 30b referring to FIG. 3.

As shown in FIG. 3, the seat section 31 comprises a urethane-foamed seat cushion part 35 (low rigidity part) which has the superior cushion performance (flexibility) and which buttocks of the seated passenger contact, a cushion form part 36 (high rigidity part) which is made of a harder material, such as foamed polypropylene, so as to have higher rigidity than the seat cushion part 35, and seat cushion frames 37 which are made of a steel plate or the like. Herein, a whole surface of the seat section 31 is covered with a skin (not illustrated).

The cushion form part 36 is provided below the seat cushion part 35, that is, at a position which is located at a lower level than and at a central area of the seat cushion part 35 in a bottom view. Further, the cushion form part 36 is configured to have the lighter weight than the seat cushion part 35 by forming a hollow portion, not illustrated, therein or the like, so as to have a smaller mass per unit volume than the seat cushion part 35, and also configured to have the higher rigidity than the seat cushion part 35 as described above. Herein, illustration of a skin which covers an inner structure and a whole part of the seatback section 32 is omitted in FIG. 3.

Figure 4A:
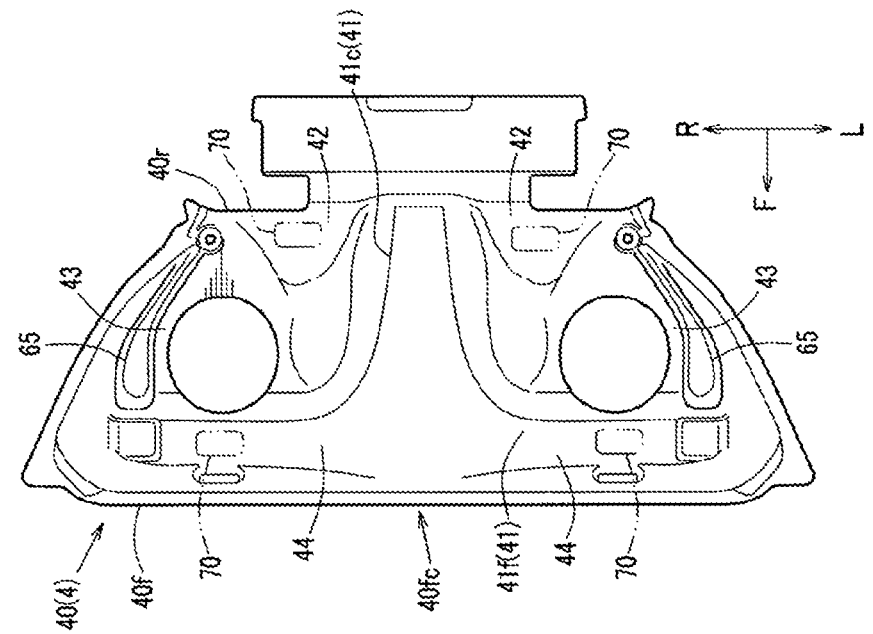
FIG. 4A is a plan view of a rear-floor front part.
Figure 4B:
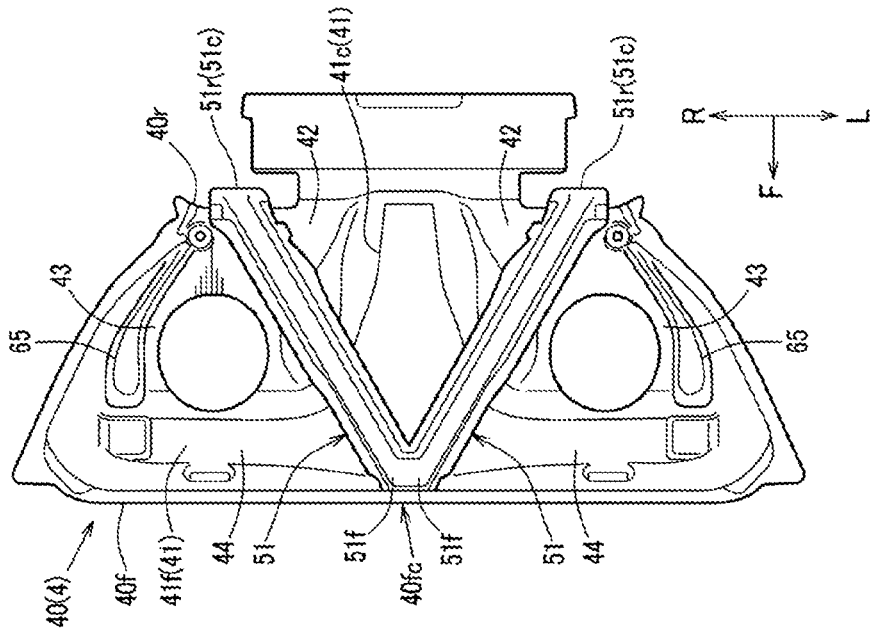
FIG. 4B is a plan view of the rear-floor front part in a state where reinforcements and seat brackets are detached.

As shown in FIGS. 1, 2, 4B and 5, seat brackets 70 are arranged at an upper surface of the rear-floor front part 40, i.e., at right-and-left high floor parts 44, which will be described later, and at another upper surface of the rear-floor front part 40, i.e., at right-and-left low floor parts 42, which will be described later (see FIG. 4B). Herein, in FIGS. 1, 2 and 5, only the seat brackets 70 which are provided at a front side of the rear-floor front part 40 are illustrated, but illustration of the seat brackets 70 which are provided at a rear side of the rear-floor front part 40 is omitted for convenience sake.

As shown in FIG. 3, the seat cushion frames 37 provided at the seat section 31 are provided at positions which correspond to the seat brackets 70 in the plan view and are located on front-and-rear sides of the cushion form part 36 when the seat section 31 is placed on the rear-floor front part 40.

Thus, the rear seat 30 is provided such that the seat cushion frame 37 is supported at the rear-floor front part 40 via the seat brackets 70 and the seat section 31 is placed on the rear-floor front part 40 (see FIG. 3) in a state where the cushion form part 36 is directly disposed on an upper surface of the rear-floor front part 40 (see FIGS. 3 and 6).

Herein, the rear-floor front part 40 as the above-described seat pan is inclined such that its front side is located at a higher level than its rear side.

Specifically, as shown in FIG. 4B, the rear-floor front part 40 comprises a central protrusion section 41c which extends in the vehicle longitudinal direction from a front end portion 40f to a rear end portion 40r at a central portion, in the vehicle width direction, of the rear-floor front part 40 and a front-side protrusion section 41f which extends in the vehicle width direction on right-and-left both sides of the central protrusion section 41c. Herein, the central protrusion section 41c and the front-side protrusion section 41f are collectively called a protrusion section 41.

In other words, as shown in FIGS. 3 and 4B, the rear-floor front part 40 is integrally formed by the low floor parts 42 which extend forwardly substantially horizontally from the rear end of the rear-floor front part 40 at the right-and-left both sides, slant parts 43 which extend obliquely forwardly-and-upwardly from respective front ends of the low floor parts 42, and high floor parts 44 which extend forwardly substantially horizontally from respective front ends of the slant parts 43.

The above-described front-side protrusion section 41f is formed by the right-and-left high floor parts 44, and the front-side protrusion section 41f and the central protrusion section 41c are formed in a roughly T shape in the plan view (see FIG. 4B).

In the present embodiment, as shown in FIGS. 1, 2, 4B and 5, the front-side seat brackets 70 which are provided on the right-and-left both sides of the front side of the rear-floor front part 40 are fixed to respective upper surfaces of the right-and-left front-side protrusion section 41f, and the rear-side seat brackets 70 which are provided on the right-and-left both sides of the rear side of the rear-floor front part 40 are fixed to respective upper surfaces of the right-and-left low floor parts 42 (see FIG. 4B).

As shown in FIGS. 1, 2, 4A, 5 and 6, at the above-described rear-floor front part 40 are provided right-and-left reinforcements 51 which respectively extend obliquely forwardly-and-inwardly in the vehicle width direction from right-and-left both sides, in the vehicle width direction, of the rear-floor front part 40. Each of these reinforcements 51 is, as shown in FIG. 6, integrally formed by right-and-left side wall portions 51a, an upper wall portion 51b, and flange portions 51c which extend from a periphery of the side wall portion 51a, such as a lower end of the side wall portion 51a, and as shown in FIGS. 1, 2 and 5, this reinforcement 51 is configured to have a hat-shaped cross section such that a closed cross section 51s (see FIG. 6) extending in an extension direction of the reinforcement 51 is formed primarily between this member 51 and the rear-floor front part 40 by joining the flange portions 51c to the upper surface of the rear-floor front part 40 and a front wall portion 15f of the rear-side rear cross member 15.

Thus, the right-and-left reinforcements 51 are configured in a V shape in the plan view such that they respectively extend toward the front end portion 40f of the rear-floor front part 40 from the front wall portion 15f of the rear-side cross member 15 and their respective front end portions 51f are integrally connected to each other at around a central portion 40fc, in the vehicle width direction, of the front end portion 40f of the rear-floor front part 40, that is—at a front end portion of the central protrusion section 41c (see FIG. 4B) in the present embodiment (see FIGS. 2 and 4A). Herein, the respective closed cross sections 51s of the right-and-left reinforcements 51 are continuous to each other at a connection portion (51f) where the respective front end portions 51f are integrally connected to each other.

The reinforcement 51 is configured, as shown in FIGS. 1 and 6, such that the upper wall portion 51b extends substantially horizontally along the extension direction of the reinforcement 51 at a higher level than the high floor part 44 and a vertical height of the side wall portion 51a changes according to a forwardly-rising shape (i.e., the height of the upper surface) of the rear-floor front part 40. That is, the reinforcement 51 is configured such that a vertical width of the side wall portion 51a becomes smaller in stages as the reinforcement 51 passes through the low floor part 42, the slant part 43, and the high floor part 44.

As shown in FIGS. 1, 2, 4A, 4B and 6, a pair of right-and-left beads 65 which are provided on the outward side, in the vehicle width direction, of the pair of right-and-left reinforcements 51 are integrally formed at the rear-floor front part 40.

The right-and-left beads 65 are configured to extend obliquely forwardly-and-outwardly, in the vehicle width direction, from a vicinity of the rear end portions 51r (see FIG. 2) of the right-and-left reinforcements 51, i.e., from the low floor parts 42 of the rear-floor front part 40, and such that the front end portions of the beads 65 are positioned at front ends (upper ends) of the slant parts 43 and on the outward side, in the vehicle width direction, of the front-side seat brackets 70 (see FIGS. 1, 2 and 4A). That is, each of the beads 65 is configured such that an outward edge, in the vehicle width direction, thereof extends along an outward edge, in the vehicle width direction, of the slant part 43 (see FIG. 2).

Thus, the bead 65 is configured such that a distance, in the vehicle width direction, between this bead 65 and the frame member 6 provided on the outward side of the bead 65 becomes gradually narrower as it goes forwardly, that is, the bead 65 is configured to extend obliquely forwardly-and-outwardly in the vehicle width direction.

Herein, while a rear end portion of the bead 65 is positioned in the vicinity of the rear end portion 51r (see FIG. 2) of the reinforcement 51 in the present embodiment, the bead of the present disclosure is not limited to this structure but this bead may be configured to extend obliquely forwardly-and-outwardly, in the vehicle width direction, from the rear end portion 51r of the reinforcement 51 continuously with no gap.

Further, as shown in FIG. 6, the bead 65 is provided at the rear-floor front part 40 such that it protrudes upwardly from its peripheral part 40, and in the present embodiment, its protrusion shape is such that a width of a front part of the protruding bead 65 is relatively wide compared to that of its rear part as shown in FIGS. 1 and 2.

As shown in FIG. 2, the above-described right-and-left reinforcements 51 and the above-described right-and-left beads 65 are configured in a W shape at the rear-floor front part 40 in the plan view. Further, at the rear-floor front part 40 are formed, in total, three truss structures Ta, Tb, Tc (triangular reinforcing structures) which are made at least by the right-and-left reinforcements 51 and the right-and-left beads 65 and positioned at a central area and right-and-left both side areas of the rear-floor part 40, respectively.

In the present embodiment, the truss structure Tc (center truss structure Tc) is partitioned by the right-and-left reinforcements 51 and the rear-side rear cross member 15 at the central area, in the vehicle width direction, of the rear-floor front part 40, the truss structure Ta (right-side center truss structure Ta) is partitioned by the right-side reinforcements 51, the right-side bead 65, and the front-side rear cross member 14 at the right-side area, in the vehicle width direction, of the rear-floor front part 40, and the truss structure Tb (left-side center truss structure Tb) is partitioned by the left-side reinforcements 51, the left-side bead 65, and the front-side rear cross member 14 at the left-side area, in the vehicle width direction, of the rear-floor front part 40. Thus, by arranging the three truss structures Ta, Tb, Tc which have substantially the same shape and the same size over a nearly whole area of the rear-floor front part 40 (covering over at least the slant part 43 in the plan view), the whole part (area) of the rear-floor front part 40 (especially the slant part 43) can be reinforced uniformly.

Further, as shown in FIGS. 2, 5 and 6, the cushion form part 36 provided at the seat section 31 of the rear seat 30 is directly placed on the slant part 43 of the rear-floor front part 40 which is positioned on the outward side, in the vehicle width direction, of the reinforcement 51, and in the present embodiment, this cushion form part 36 is placed such that it extends across the bead 65 integrally formed at the slant part 43 at least.

Thus, by placing the cushion form part 36 on the slant part 43 of the forwardly-rising shaped rear-floor front part 40 when the rear seat 30 is placed on the rear-floor front part 40, the rear seat 30 can be supported such that the seat section 31 (sitting surface) takes the forwardly-rising shaped position for keeping the stable sitting position of the passenger seated in the rear seat 30.

Accordingly, when the vehicle is accelerated/decelerated or vehicle has the rear collision, the load, in the vehicle longitudinal direction, transmitted from the rear seat 30 to the rear-floor front part 40 is transmitted primarily through the cushion form part 36 of the seat section 31.

As described above, the rear vehicle-body structure of the vehicle of the present embodiment comprises the forwardly-rising shaped rear-floor part 40 (as a rear floor) on which the rear seat 30 for the vehicle is placed (i.e., the rear-floor part 40 is inclined such that its front side is located at the higher level than its rear side), the right-and-left reinforcements 51 (as a right-and-left first reinforcing extension) which are configured such that their rear end portions 51r are positioned on the both sides, in the vehicle width direction, of the rear-floor front part 40 and to extend obliquely forwardly-and-inwardly, in the vehicle width direction, from the rear end portions 51r, and the right-and-left beads 65 (as a right-and-left second reinforcing extension) which are provided on the outward side, in the vehicle width direction, of the reinforcements 51 and configured to extend obliquely forwardly-and-outwardly, in the vehicle width direction, from the vicinity of the rear end portions 51r of the reinforcements 51 (see FIGS. 1, 2, 4A and 6).

According to this structure, the rear-collision load can be smoothly transmitted to the forward side of the vehicle through the reinforcements 51 in the vehicle rear collision and also the substantially-rectangular reinforcing structure, i.e., the truss structures Ta, Tb, Tc, can be formed by using the reinforcements 51 and beads 65 (see FIG. 2).

Thereby, the seat section 31 of the rear seat 30 can be supported, and also the surface rigidity of the rear-floor front part 40 which is inclined such that its front side is located at the higher level than its rear side for keeping the appropriate sitting position of the passenger seated in the seat section 31 for the vehicle can be increased.

Additionally, this structure can contribute to suppression of vibrations transmitted to the rear-floor front part 40 from rear suspensions (not illustrated) which are provided on a vehicle rearward side and right-and-left both sides of the rear-floor front part 40 and the like during vehicle traveling because of increasing of the surface rigidity of the rear-floor front part 40, and also since the rigidity of the whole part of the vehicle body including the floor is improved, the steering stability of the vehicle can be increased.

Further, in the present embodiment, the right-and-left first reinforcing extension is made by the right and left reinforcements 51, each of which is joined to the upper surface of the rear-floor front part 40 so as to form the closed cross section 51s (see FIG. 6) therebetween which extends in the extension direction of the first reinforcing extension portion, and each of the second reinforcing extension portions is made by the bead 65 which is integrally formed with the rear-floor front part 40 (see FIGS. 1, 2, 4A and 6).

According to this structure, since one of the first and second reinforcing extensions is made by the bead 65 which is lighter than the reinforcement 51, the weight reduction of the floor can be achieved as a whole (compared to a case where both of the first and second reinforcing extension portions are made by the reinforcements 51). Further, since the bead 65 is integrally formed with the rear-floor front part 40, the number of parts can be reduced as well.

Meanwhile, since the other of the first and second reinforcing extensions is made by the reinforcements 51, each of which has the higher rigidity than the bead 65, the surface rigidity of the rear-floor front part 40 can be further increased (compared to a case where both of the right-and-left first and second reinforcing extensions are made by the beads 65).

Especially, since the first reinforcing extension is configured to extend forwardly and inwardly in the vehicle width direction at the central side, in the vehicle width direction, of the rear-floor front part 40 is made by the reinforcement 51 which has the high rigidity, the rear-collision load can be efficiently transmitted to the center tunnel 11 from the frame members 6 provided at the right-and-left both sides of the vehicle-body rear part, i.e., forwardly from the vehicle-body rear part.

Moreover, in the present embodiment, the respective front end portions 51f of the right-and-left reinforcements 51 are connected to the central portion 40fc, in the vehicle width direction, of the front end portion 40f of the rear-floor front part 40 (see the same figures).

According to this structure, the rear-collision load (see the arrow F1 shown in FIG. 2) inputted to the frame members 6 which is provided the both sides of the vehicle-body rear part can be smoothly transmitted to the center tunnel 11 which extends forwardly from the rear end portion of the floor panel 1 at the central position, in the vehicle width direction, of the floor panel 1 from the above-described both sides through the right-and-left reinforcements 51 in a plan view (see the arrows F2, F3 shown in FIG. 2).

Also, in the present embodiment, this rear vehicle-body structure further comprises the front-side rear cross member 14 (as a front-side cross member) which is joined to the front end portion 40f of the rear-floor front part 40 and extends in the vehicle width direction along the front end portion 40f of the rear-floor front part 40 (see FIGS. 1 through 3 and 5), and the respective front end portions 51f of the right-and-left reinforcements 51 are arranged closely to the front-side rear cross member 14 (see FIGS. 1, 2 and 5). In this particular embodiment, the front end portions 51f of the right-and-left reinforcements 51 are positioned so as to overlap the front-side rear cross member 14 in the plan view, so that these front end portions 51f are connected to the front-side rear cross member 14 (see FIG. 5).

According to this structure, since the truss structures Ta, Tb where the right-and-left reinforcements 51, the beads 65, and the front-side rear cross member 14 substantially enclose the inside areas in the plan view can be provided at the both sides, in the vehicle width direction, of the rear-floor front part 40 (see FIG. 2), the surface rigidity of the rear-floor front part 40 can be further increased.

Further, in the present embodiment, this rear vehicle-body structure further comprises the rear-side rear cross member 15 which is joined to the rear end portion 40r (see FIG. 4A) of the rear-floor front part 40 and extends in the vehicle width direction along the rear end portion 40r of the rear-floor front part 40, and the respective rear end portions 51r of the right-and-left reinforcements 51 are arranged closely to the rear-side rear cross member 15 (see FIGS. 1, 2 and 5). In this particular embodiment, the rear end portions 51r of the right-and-left reinforcements 51 are positioned so as to overlap the rear-side rear cross member 15 in the plan view, so that these rear end portions 51r are connected to the rear-side rear cross member 15.

According to this structure, since the truss structure Tc where the right-and-left reinforcements 51 and the rear-side rear cross member 15 substantially enclose an inside area in the plan view can be provided at the central side, in the vehicle width direction, of the rear-floor front part 40 (see FIG. 2), the surface rigidity of the rear-floor front part 40 can be further increased.

Additionally, in the present embodiment, the rear-floor front part 40 is integrally formed by the low floor part 42 which extends in the longitudinal direction, the slant part 43 which extends obliquely forwardly-and-upwardly from the front end of the low floor part 42, and the high floor part 44 which extends forwardly from the upper front end of the slant part 43 (see FIGS. 3 and 4B), the seat section 31 of the rear seat 30 comprises the seat cushion part 35 (see FIG. 3) which forms the seat surface and the cushion form part 36 (as a high-rigidity part) which has the smaller mass per unit volume (i.e., the lighter weight) than the seat cushion part 35 and has the high rigidity (see FIGS. 3, 5 and 6), the cushion form part 36 being positioned at the slant part 43 of the rear-floor front part 40, and the reinforcement 51 and the bead 65 are provided at least at the slant part 43 of the rear-floor front part 40 (see FIGS. 1, 2, 4A, 5 and 6).

According to this structure, since the seat section 31 of the rear seat 30 comprises the seat cushion part 35 forming the seat surface of the seat section 31, the cushion performance of the seat section 31 can be properly secured seat section. Additionally, since the seat section 31 of the rear seat 30 comprises the cushion form part 36, the weight reduction of the rear seat 30 can be achieved and also it can be suppressed that the seat section 31 collapses because of a load applied thereto which occurs when the seat section 31 is moved in the longitudinal direction, thereby keeping the shape of the seat section 31.

Further, since the cushion form part 36 is positioned at the slant part 43 of the rear-floor front part 40, it can be effectively suppressed that the seat section 31 of the rear seat 30 slides and moves, in the longitudinal direction, relative to the rear-floor front part 40 when the vehicle is accelerated/decelerated (especially in vehicle deceleration) (the so-called submarine phenomenon).

Moreover, since the reinforcements 51 and the beads 65 are provided at least at the slant part 43 of the rear-floor front part 40, the surface rigidity of the slant part 43 of the rear-floor front part 40 which is required to prevent the seat section 31 of the rear seat 30 from sliding and moving, in the longitudinal direction, relative to the rear-floor front part 40 can be effectively increased.

Also, since the seat cushion frames 37 are provided on the forward-and-rearward sides of the cushion form part 36 and the seat cushion frames 37 are supported at the high floor part 44 and the low floor part 42 which are horizontal and provided at the forward-and-rearward sides of the rear-floor front part 40 via the seat brackets 70 (see FIG. 3), the weights of the rear seat 30 and the passenger seated in the rear seat 30 can be supported stably by the horizontal high-and-low floor parts 44, 42 during the vehicle traveling (substantially at a constant traveling speed).

Herein, the present disclosure is not limited to the above-described embodiment in which the rear seat 30 is placed on the rear-floor front part 40 such that the cushion form part 36 is directly placed on the rear-floor front part 40 and the seat cushion frames 37 are attached onto the rear-floor front part 40 via the seat brackets 70, but any other structure may be adopted as long as the cushion form part 30 is provided at the forwardly-rising shaped rear-floor front part 40.

The present disclosure should not be limited to the above-described embodiment and any other modifications or improvements may be applied within the scope of a spirit of the present disclosure.

What is claimed is:

1. A rear vehicle-body structure of a vehicle, comprising:
   a floor on which a seat for the vehicle is placed, the floor being inclined such that a front side thereof is located at a higher level than a rear side thereof;
   a right-and-left first reinforcing extension, the right-and-left first reinforcing extension being configured such that a rear end thereof is positioned on both sides, in a vehicle width direction, of the floor and to extend forwardly and inwardly in the vehicle width direction from the rear end; and
   a right-and-left second reinforcing extension provided on an outward side in the vehicle width direction of the right-and-left first reinforcing extension, the right-and-left second reinforcing extension being configured to extend forwardly and outwardly in the vehicle width direction from a vicinity of the rear end of the right-and-left first reinforcing extension,
   wherein the right-and-left first reinforcing extension includes a right reinforcement and a left reinforcement, each of the right reinforcement and the left reinforcement being joined to an upper surface of the floor so as to form a closed cross section therebetween which extends in an extension direction of the right-and-left first reinforcing extension, and
   the right-and-left second reinforcing extension is a bead which is integrally formed with the floor.

2. The rear vehicle-body structure of the vehicle of claim 1, wherein a respective front end of each of the right reinforcement and the left reinforcement is connected to a central portion, in the vehicle width direction, of a front end portion of the floor.

3. The rear vehicle-body structure of the vehicle of claim 1, further comprising
   a front-side cross member which is joined to a front end portion of the floor and extends in the vehicle width direction along the front end portion of the floor, and a respective front end of each of the right reinforcement and the left reinforcement are arranged proximate to the front-side cross member.

4. The rear vehicle-body structure of the vehicle of claim 1, further comprising a rear-side cross member which is joined to a rear end portion of the floor and extends in the vehicle width direction along the rear end portion of the floor, and a respective rear end of each of the right reinforcement and the left reinforcement are arranged proximate to the rear-side cross member.

5. The rear vehicle-body structure of the vehicle of claim 1, wherein the floor is integrally formed by a low floor part which extends in a longitudinal direction, a slant part which extends obliquely forwardly-and-upwardly from a front end of the low floor part, and a high floor part which extends forwardly from an upper front end of the slant part, and a seat section of the seat for the vehicle comprises a seat cushion part which forms a seat surface and a high-rigidity part which has a smaller mass per unit volume than the seat cushion part and has a high rigidity, the high-rigidity part being positioned at the slant part of the floor, and the reinforcement and the bead are provided at least at the slant part of the floor.

\* \* \* \* \*